United States Patent
Augustsson et al.

(10) Patent No.: US 12,344,034 B2
(45) Date of Patent: Jul. 1, 2025

(54) VEHICLE WHEEL END ASSEMBLY AND A VEHICLE

(71) Applicant: Volvo Truck Corporation, Gothenburg (SE)

(72) Inventors: Kent Augustsson, Bollebygd (SE); Marcel Palmgren, Torslanda (SE); Ramachandran Sandrasekaran, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 507 days.

(21) Appl. No.: 17/795,434

(22) PCT Filed: Jan. 21, 2021

(86) PCT No.: PCT/EP2021/051233
§ 371 (c)(1),
(2) Date: Jul. 26, 2022

(87) PCT Pub. No.: WO2021/156059
PCT Pub. Date: Aug. 12, 2021

(65) Prior Publication Data
US 2023/0050021 A1 Feb. 16, 2023

(30) Foreign Application Priority Data
Feb. 4, 2020 (IN) .............................. 202041004867

(51) Int. Cl.
*B60B 27/00* (2006.01)
*B60B 27/02* (2006.01)
(Continued)

(52) U.S. Cl.
CPC ........ *B60B 27/0078* (2013.01); *B60B 27/001* (2013.01); *B60B 27/0073* (2013.01);
(Continued)

(58) Field of Classification Search
CPC ..... B60B 27/0078; B60B 27/06; B60B 27/02; B60B 27/01; F16C 33/586; F16C 35/0635; F16C 35/073
See application file for complete search history.

(56) References Cited

U.S. PATENT DOCUMENTS 5,097,702 A * 3/1992 Nantua ................... G01P 3/443
73/115.07
5,178,472 A * 1/1993 Lawson ................ F16C 33/586
384/537

(Continued)

FOREIGN PATENT DOCUMENTS

CN          2244569 Y  *  1/1997
CN       101454596 A      6/2009
(Continued)

OTHER PUBLICATIONS

International Search Report and Written Opinion for International Patent Application No. PCT/EP2021/051233, mailed May 3, 2021, 14 pages.

(Continued)

*Primary Examiner* — S. Joseph Morano
*Assistant Examiner* — Alex Palmer
(74) *Attorney, Agent, or Firm* — Withrow & Terranova, PLLC

(57) ABSTRACT

A vehicle wheel end assembly comprising a wheel hub, rotatably mounted on a wheel axle spindle by a wheel bearing s comprising a roller bearing. The wheel bearing has a bearing inner ring mounted on an external section of the wheel axle spindle and a bearing outer ring mounted in an internal section of the wheel hub. The assembly further comprises a threaded hub nut mounted at the end of the wheel axle spindle to fix the bearing inner ring on the wheel axle spindle and a rotational lock mechanism to prevent relative rotation between the bearing inner ring and the (Continued)

wheel axle spindle. The rotational lock mechanism comprises a tangential surface arranged to intersect a part of an inner circumference of the bearing inner ring at right angles to the axis of rotation in a plane located at or adjacent an outer radial end surface of the bearing inner ring.

11 Claims, 7 Drawing Sheets

(51) Int. Cl.
    *F16C 19/38*     (2006.01)
    *F16C 33/58*     (2006.01)

(52) U.S. Cl.
    CPC ............ *B60B 27/02* (2013.01); *F16C 19/386* (2013.01); *F16C 33/586* (2013.01); *B60B 2380/14* (2013.01); *B60B 2380/70* (2013.01); *F16C 2226/70* (2013.01); *F16C 2326/02* (2013.01)

(56) References Cited

U.S. PATENT DOCUMENTS

| | | |
|---|---|---|
| 10,107,324 B1 | 10/2018 | Rode |
| 2002/0047390 A1 | 4/2002 | Aoki et al. |
| 2002/0164101 A1 | 11/2002 | Bass et al. |
| 2006/0093251 A1 | 5/2006 | Casey et al. |
| 2008/0089628 A1 | 4/2008 | Kiuchi et al. |
| 2018/0003290 A1 | 1/2018 | Figura et al. |

FOREIGN PATENT DOCUMENTS

| | | |
|---|---|---|
| CN | 108006082 A | 5/2018 |
| CN | 108930712 A | 12/2018 |
| DE | 102012207047 A1 | 11/2012 |
| DE | 102015113174 A1 | 2/2017 |
| EP | 2833012 A1 | 2/2015 |
| FR | 2729442 A1 | 7/1996 |
| GB | 1285311 A | 8/1972 |

OTHER PUBLICATIONS

International Preliminary Report on Patentability for International Patent Application No. PCT/EP2021/051233, mailed Dec. 22, 2021, 13 pages.

Intention to Grant for European Patent Application No. 21702188.0, mailed Nov. 16, 2023, 26 pages.

First Office Action for Chinese Patent Application No. 202180010219.8, mailed Dec. 14, 2024, 11 pages.

* cited by examiner

VEHICLE WHEEL END ASSEMBLY AND A VEHICLE

This application is a 35 USC 371 national phase filing of International Application No. PCT/EP2021/051233, filed Jan. 21, 2021, which claims the benefit of Indian Patent Application No. 202041004867, filed Feb. 4, 2020, the disclosures of which are incorporated herein by reference in their entireties.

TECHNICAL FIELD

The present disclosure relates to a vehicle wheel end assembly comprising a wheel spindle axle with a wheel bearing for a wheel hub and a vehicle provided with such a wheel end assembly.

BACKGROUND

Wheel end assemblies comprise a rotatable member is made up of a hub axle and a wheel bearing, wherein a bearing inner race is fitted externally onto the hub axle. In this type of wheel support bearing assembly, a portion of a hollow inboard end of the hub axle is mechanically deformed radially outwardly to bring it into contact with an end face of the inner race. In this way, the inner race can be fixed on the hub axle under an axially preloaded condition. in order to facilitate the fixing of the inner race of the roller bearing to the hub axle. An example of an assembly of this type is shown in US2008/089628.

However, under heavy load conditions, for example when turning of a vehicle, the inner race fixed on the hub axle can undergo a creep, accompanied by an increase of a bearing gap between the inner race and the hub axle. This will eventually the reduce lifetime of the bearing. A further problem with the known assembly is that the replacement of such a bearing may require the replacement of both the hub axle and the bearing, due to the permanent deformation of the axle hub during assembly.

An alternative wheel end assembly is shown in US2006/093251 wherein a bearing inner race of a roller bearing and an adapter sleeve is press-fitted externally onto the hub axle and held in a desired axial position by a lock nut screwed onto the end of the hub axle. In this arrangement a tightening fastener is provided to tighten the lock nut onto the sleeve and inhibit rotation of the lock nut.

A problem with this arrangement is that relative rotation between the bearing inner ring and the hub axle is still possible under heavy load conditions, as this arrangement is also dependent on sufficient friction between component parts to prevent rotation.

DE102012207047A 1 discloses a wheel bearing for a commercial vehicle.

The object of the disclosure is to provide an improved vehicle wheel end assembly that solves the above problems.

SUMMARY

In the subsequent text, the term "wheel axle spindle" is used to denote the axle onto which a wheel bearing is mounted. In the art, this part can also be termed "axle hub" and is a fixed axle encircled by a rotating wheel hub supported by a bearing. When referring to relative positions in the axial direction of the wheel end assembly, the term "inner" refers to a part or surface that is located closer to or facing the central longitudinal axis of the vehicle than a comparative part or surface. Similarly, the term "outer" refers to a part more remote from or facing away from the central longitudinal axis of the vehicle.

According to a first aspect, the disclosure relates to a vehicle wheel end assembly comprising a wheel hub having a central axis of rotation, which wheel hub is rotatably mounted on a wheel axle spindle by a wheel bearing comprising at least one roller bearing. The wheel bearing has a bearing inner ring mounted on an external section of the wheel axle spindle and a bearing outer ring mounted in an internal section of the wheel hub. A threaded hub nut is mounted at the end of the wheel axle spindle and is tightened to fix the bearing inner ring in a predetermined axial position on the wheel axle spindle. A rotational lock mechanism arranged to prevent relative rotation between the bearing inner ring and the wheel axle spindle. The rotational lock mechanism cooperating portions on the bearing inner ring and the wheel axle spindle, respectively. The rotational lock mechanism comprises a tangential surface arranged to intersect a part of an inner circumference of the bearing inner ring at right angles to the axis of rotation in a plane located at or adjacent an outer radial end surface of the bearing inner ring. When assembled, the tangential surface of the bearing inner ring is arranged in contact with a tangential recess in the peripheral surface of the wheel axle spindle. The cooperating surfaces form the rotational lock mechanism that prevents relative rotation. The tangential recess is located at the outer surface of the wheel axle spindle, which recess extends axially inwards from the outer end of the wheel axle spindle and at least past the axial extent of the tangential surface with the bearing inner ring in its mounted position on the wheel axle spindle.

The tangential recess in the peripheral surface of the wheel axle spindle is located axially between an outer threaded portion for the hub nut and a seat for accommodating the bearing inner ring on the wheel axle spindle. The tangential surface a flat cut-out in the outer surface of the wheel axle spindle. The width of the recess parallel to and at right angles to the axis of rotation corresponds to the chord of a circle segment portion extending from the inner circumference of the bearing inner ring. The circle segment has a chord length determined by a central angle selected in the interval 5° to 100°.

According to a preferred example, the rotational lock mechanism comprising the tangential surface is arranged on an annular projection extending axially out of the outer end surface of the bearing inner ring. According to an alternative example, the rotational lock mechanism comprising the tangential surface is arranged radially inside and flush with the outer end surface of the bearing inner ring.

During mounting of the wheel end assembly, the bearing inner ring of the roller bearing and is press-fitted externally onto a seat provided on the wheel spindle axle. The bearing inner ring is held in a desired axial position by a hub nut screwed onto the end of the wheel spindle axle. In this arrangement it is desirable to prevent axial movement and inhibit rotation of the lock nut after tightening thereof. In the above example where an annular projection extends axially out of the outer end surface of the bearing inner ring, the outer periphery of the annular projection has a circumferential recess, or alternatively a circumferential protrusion. This circumferential recess or protrusion is arranged to cooperate with a resiliently deformable hub nut locking means extending axially inwards from the inner end surface of the hub nut. The hub nut locking means comprises at least one axially extending protrusion, which at least one protrusion is resiliently deformable and arranged to snap into contact with the circumferential recess. Alternatively, the hub nut locking means comprises an axially extending annular protrusion having multiple radial slots with intermediate resiliently deformable protrusions arranged to snap into contact with the circumferential recess.

The hub nut is used for retaining the bearing inner ring in a predetermined axial position on the wheel axle spindle. The hub nut is brought into contact with the bearing inner ring and is tightened to a predetermined torque level. When the desired torque has been applied, the hub nut is held in position by the resiliently deformable hub nut locking means cooperating with the bearing inner ring. This locking feature allows a safety washer, normally placed between the hub nut and the bearing inner ring, to be eliminated.

According to a first example, at least the outer end of the bearing inner ring is provided with a circumferential groove in the internal periphery for a sealing element between the bearing inner ring and the wheel axle spindle. In the case of a dual roller bearing with a split inner ring, both the outer and inner ends of the respective split inner rings are provided with a circumferential groove for a sealing element in their internal periphery. This arrangement can be used for eliminating a central sealing element or sealing assembly between split inner ring portions.

According to a second example, the axially outer end of the bearing inner ring is provided with a circumferential groove axially inside the rotational lock mechanism between the bearing inner ring and the wheel axle spindle. The circumferential groove is provided for a sealing element between the bearing inner ring and the wheel axle spindle. The wheel bearing in this second example can also be a dual roller bearing with a split bearing inner ring. A suitable sealing element for the above examples is an O-ring made from rubber or a similar elastic polymer material.

According to a second aspect, the disclosure relates to a vehicle, which vehicle comprises at least one wheel axle with a wheel end assembly as described above.

An advantage with the disclosure as describe above is that the rotational lock mechanism formed by cooperating surfaces on the bearing inner ring and the wheel axle spindle, respectively, provides an effective and simple arrangement for preventing relative rotation. The solution does not require any additional components and only involves a minimum of machining of the bearing inner ring and the wheel axle spindle. If required, the arrangement also allows the bearing or parts thereof to be removed and replaced.

A further advantage is that the hub nut used for retaining the bearing inner ring on the wheel axle spindle can be tightened by a predetermined torque and held in position by a locking feature on the bearing inner ring. This allows a safety washer, normally placed between the hub nut and the bearing, to be eliminated. In this way it is possible to reduce the number of components required which in turn saves cost and assembly time.

The disclosure further employs a sealing assembly between the bearing inner ring and the wheel axle spindle. In a dual roller bearing with a split inner ring, the sealing assembly allows the conventional central seal between the split inner rings to be eliminated. This simplifies assembly of the bearing as the inventive sealing assembly does not have issues with the relatively high force used when force fitting the bearing inner rings. Also, the problem of identifying a correct position for the central seal inside the hub can be eliminated.

BRIEF DESCRIPTION OF THE DRAWINGS

In the following text, the disclosure will be described in detail with reference to the attached drawings. These schematic drawings are used for illustration only and do not in any way limit the scope of the disclosure. In the drawings.

DETAILED DESCRIPTION OF EXAMPLE EMBODIMENTS OF THE INVENTION

Figure 1:
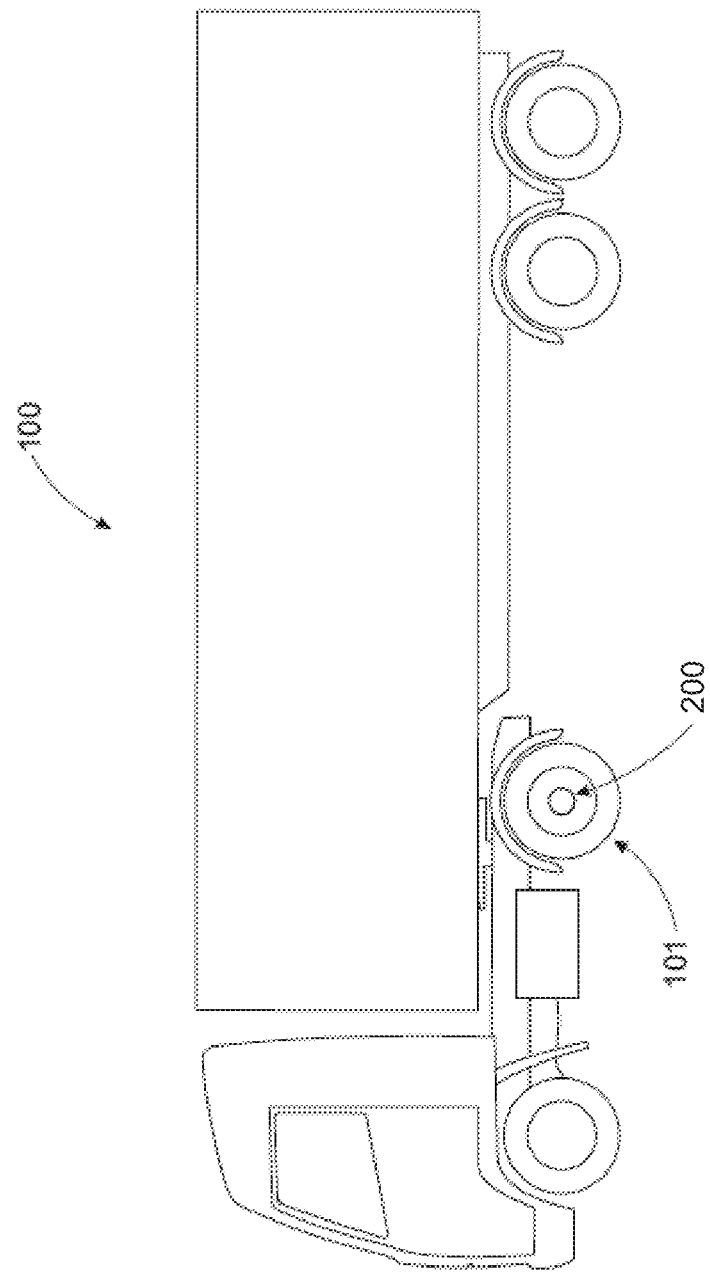
FIG. 1 shows a schematically indicated vehicle provided with a wheel end assembly.

FIG. 1 shows a schematically indicated vehicle 100 comprising a driven rear wheel 101 provided with a wheel end assembly 200.

Figure 2:
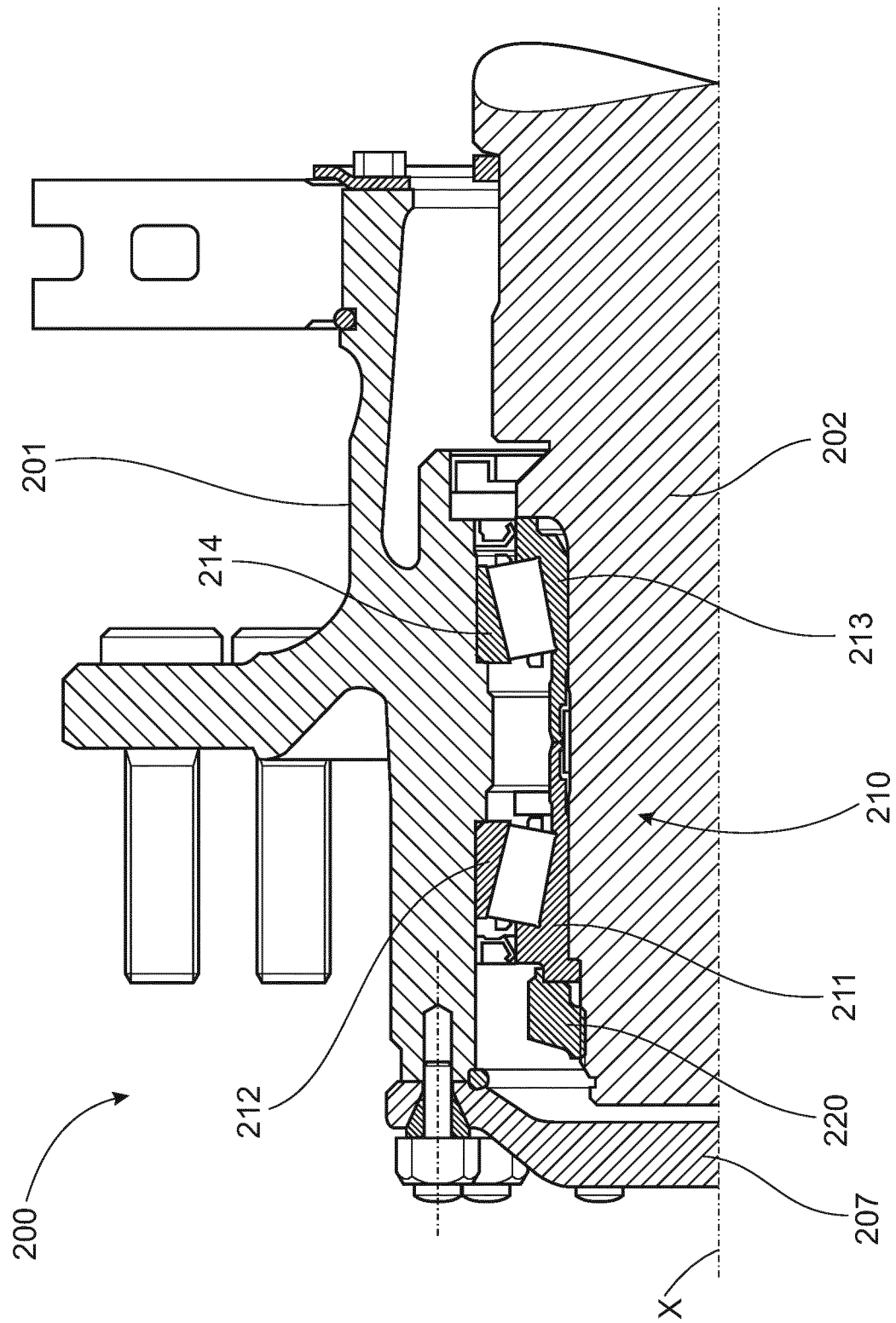
FIG. 2 shows a schematically illustrated wheel end assembly.

FIG. 2 shows a schematically illustrated vehicle wheel end assembly 200 according to the disclosure. The wheel end assembly 200 comprises a wheel hub 201 having a central axis of rotation X, which wheel hub 201 is rotatably mounted on a wheel axle spindle 202 by a wheel bearing 210 comprising a roller bearing. In this example, the bearing is a dual conical roller bearing with a split inner ring. The wheel bearing 210 has a first bearing inner ring 211 mounted on an external section of the wheel axle spindle 202 and a bearing outer ring 212 mounted in an internal section of the wheel hub 201. The dual roller bearing in FIG. 2 also comprises a second bearing inner ring 213 and a corresponding bearing outer ring 214 mounted axially inside the first bearing inner ring 211. A hub nut 220 having an internal threaded portion 223 is mounted on an external threaded portion 205 (see FIG. 3) at the end of the wheel axle spindle 202 to fix the bearing inner ring 211 in a predetermined axial position on the wheel axle spindle 202. A protective end cover 207 is mounted onto an annular outer end of the hub 201 in order to protect the wheel axle spindle 202 and the outer portion of the wheel bearing 210 from water spray and particles.

Figure 3:
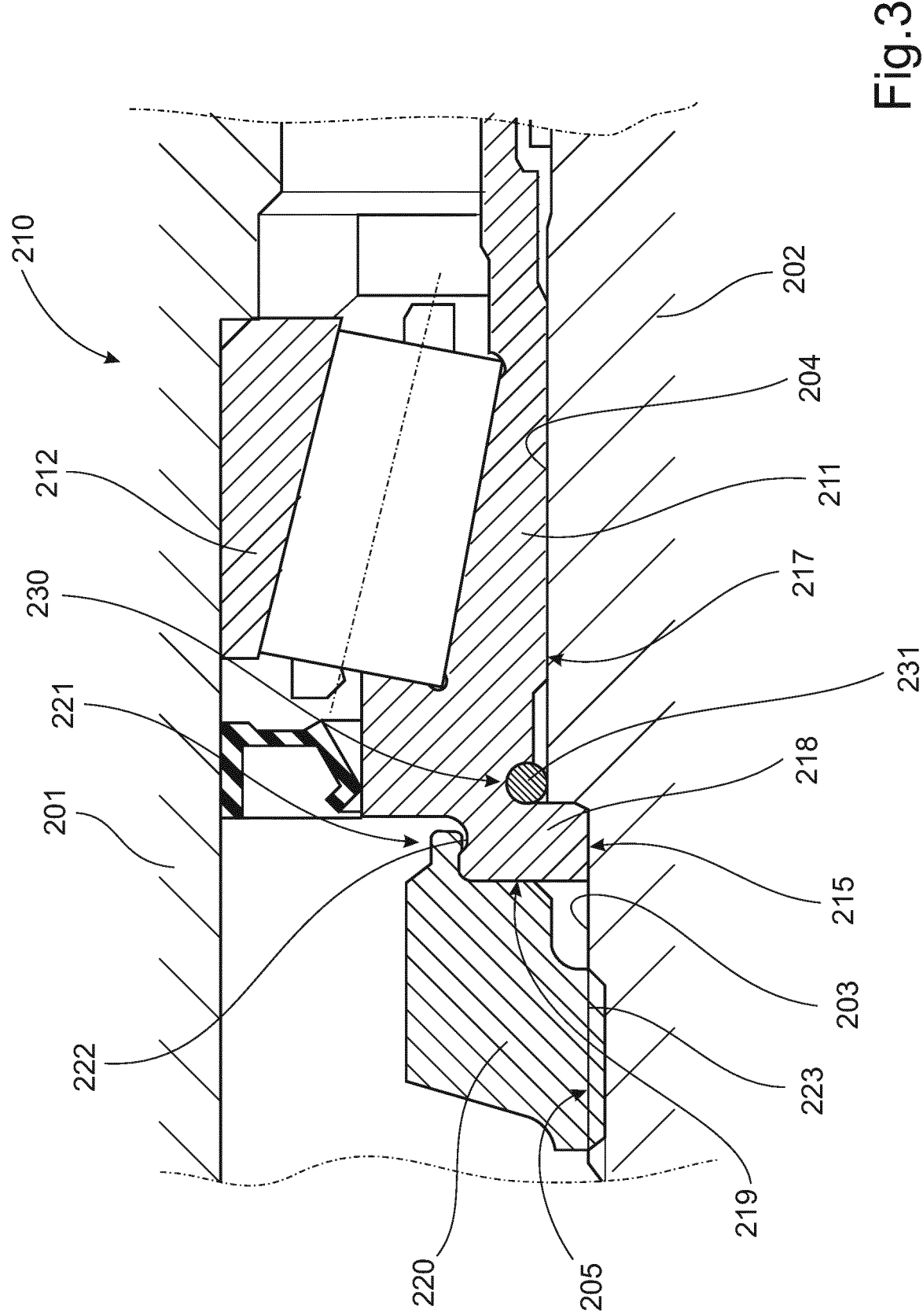
FIG. 3 shows a partial enlargement of the wheel end assembly shown in FIG. 2.
Figure 4:
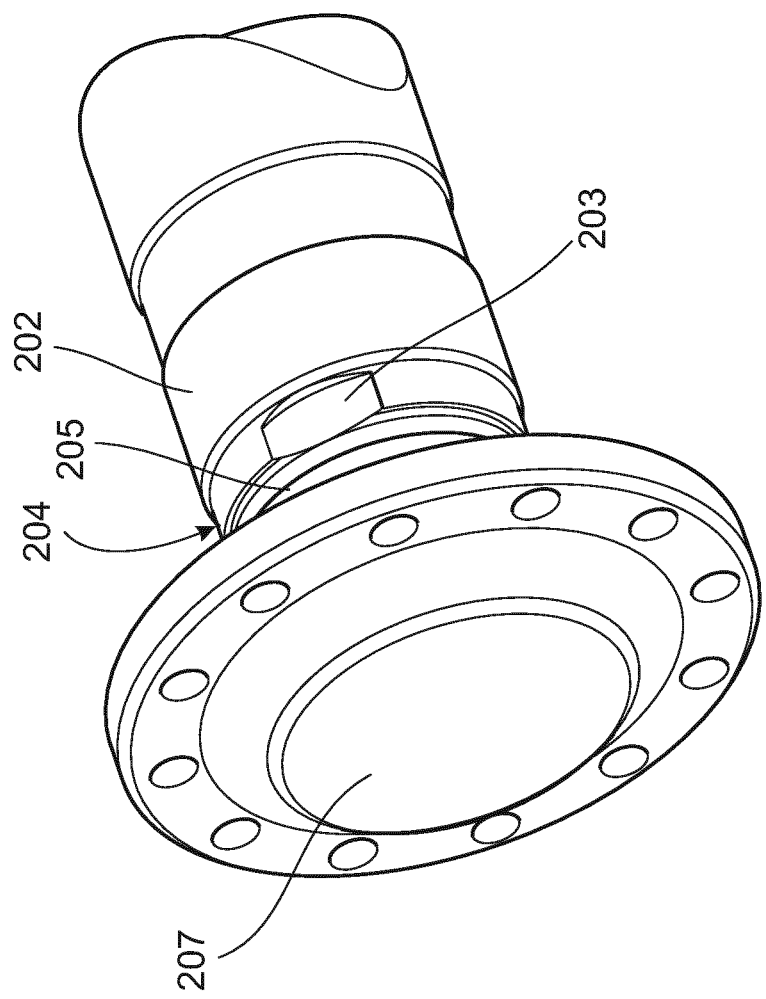
FIG. 4 shows a perspective view of a wheel axle spindle.
Figure 5:
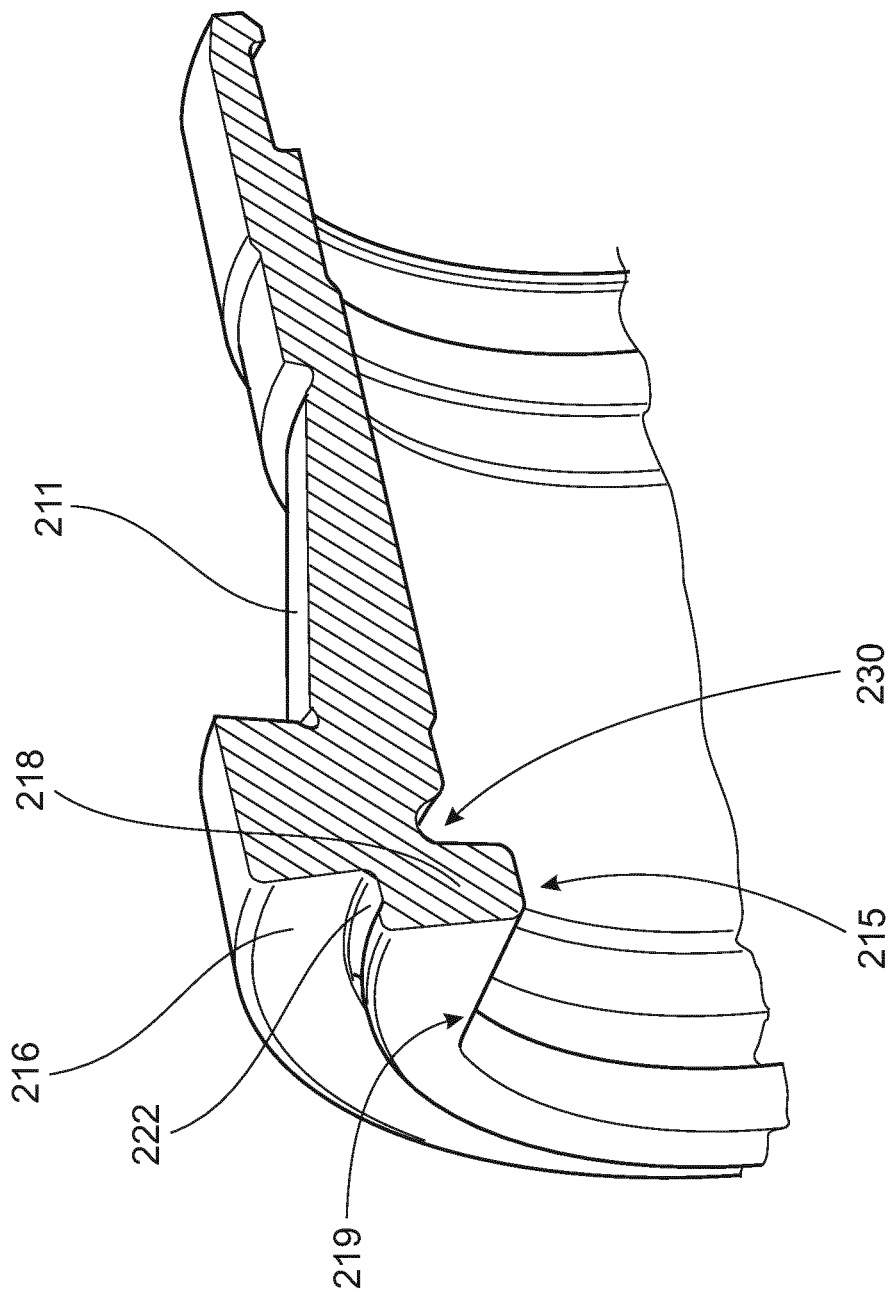
FIG. 5 shows a schematic illustration of a cross-section through a bearing inner ring.
Figure 7:
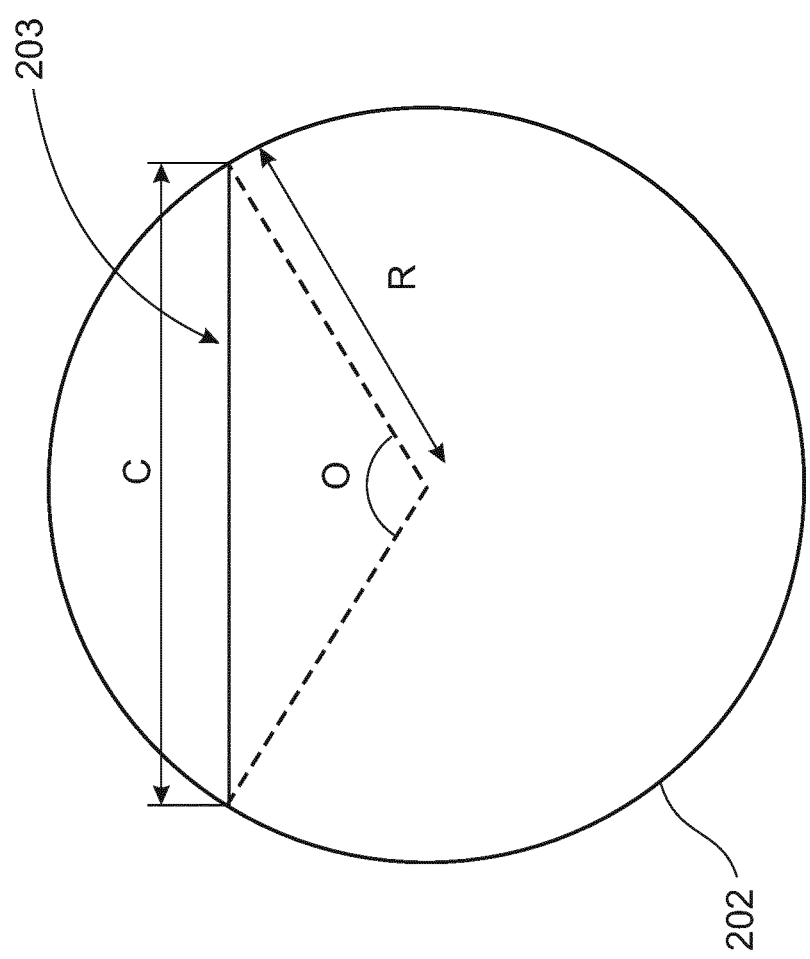
FIG. 7 shows an end view of a wheel axle spindle.

FIG. 3 shows a partial enlargement of the wheel end assembly shown in FIG. 2. FIG. 3 shows a rotational lock mechanism 203, 215 that is arranged to prevent relative rotation between the bearing inner ring 211 and the wheel axle spindle 202. The rotational lock mechanism comprises a tangential surface 215 arranged to intersect a part of an inner circumference 217 of the bearing inner ring 211 at right angles to the axis of rotation X in a plane located adjacent an outer radial end surface 216 (see FIG. 5) of the bearing inner ring 211. The tangential surface 215 is arranged in contact with a tangential recess 203 in the outer peripheral surface 204 of the wheel axle spindle 202 to prevent relative rotation. The tangential recess 203 in the peripheral surface 204 of the wheel axle spindle 202 is located between the outer threaded portion 205 for the hub nut 220 and a seat for accommodating the bearing inner ring 211 on the wheel axle spindle 202. This is indicated in FIG. 4, which shows a perspective view of the wheel axle spindle 202, the tangential surface 203 a flat cut-out in the outer peripheral surface 204 of the wheel axle spindle. FIG. 5 shows a cross-section through the bearing inner ring 211. The figure indicates the location of the tangential surface 215 at the inner circumference 217 of the bearing inner ring 211. The tangential surface 215 is the chord of a circle segment portion extending from the inner circumference 217 of the bearing inner ring 211 (see FIG. 7). The corresponding tangential surface 203 on the wheel axle spindle 202 is illustrated in FIG. 7, which shows an end view of a wheel axle spindle. FIG. 7 shows that the circle segment has a chord length C determined by a central angle θ, which angle is selected in the interval 5° to 100°. The size of the angle is dependent on the expected maximum loading on the wheel end assembly, wherein a greater angle can be selected if the load is relatively high. Similarly the axial width of the tangential surface 215 can be increased for a rotational lock mechanism expected to withstand a relatively high torque.

In the example shown in FIGS. 3 and 5, the rotational lock mechanism 203, 215 comprises a tangential surface 215 arranged on an annular projection 218 extending axially out of the outer end surface 216 of the bearing inner ring 211. The outer periphery of the annular projection 218 has a circumferential recess 222 arranged to cooperate with a resiliently deformable hub nut locking means 221 extending axially inwards from the hub nut 220 towards the bearing inner ring 211. The hub nut locking means 221 comprises at least one axially extending protrusion 224 (see FIG. 6). The at least one protrusion is arranged to be resiliently deformed by a portion of the annular projection 218 as the hub nut 220 first comes into contact with the bearing inner ring 211. As the hub nut is tightened further, the at least one protrusion is arranged to snap into contact with the circumferential recess 222 around the annular projection 218. The hub nut 220 is then tightened into contact with an axially outer end surface 219 on the annular projection 218 of the bearing inner ring 211. The hub nut locking means 221 can comprise a single protrusion, several equidistant protrusions around the circumference of the hub nut, or an axially extending annular protrusion having multiple radial slots with separated intermediate protrusions arranged to snap into contact with the circumferential recess 222.

Figure 6:
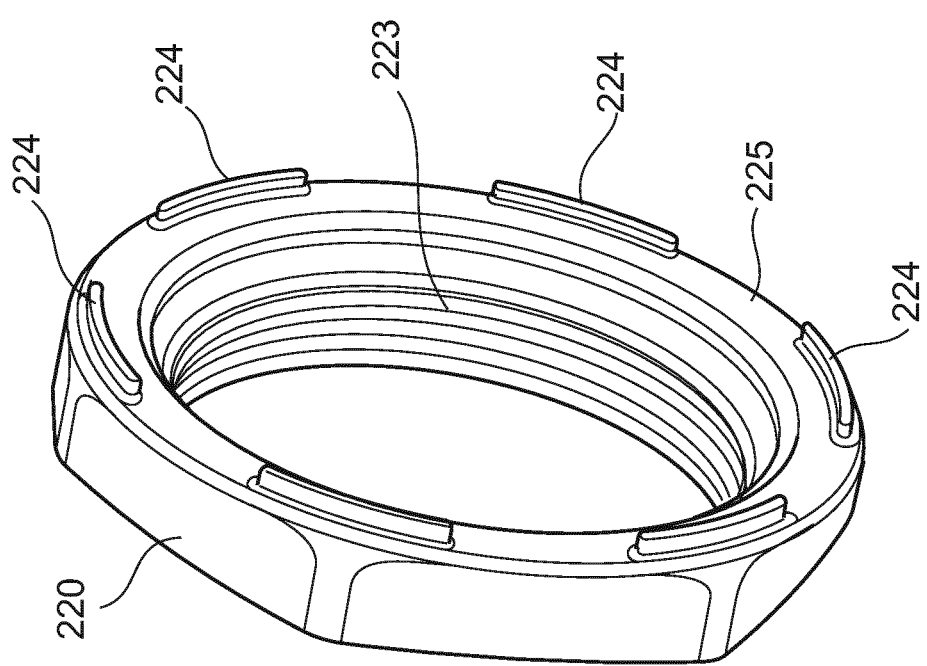
FIG. 6 shows a perspective view of a hub nut.

FIG. 6 shows a perspective view of the inner face of the hub nut 220 facing the bearing inner ring. In this example, the hub nut locking means comprises six equidistant protrusions 224 around the circumference of the hub nut 220. Each projection 224 has a nose at its free end which extends radially inwards to snap into and cooperate with the circumferential recess 222 around the annular projection 218 (see FIG. 3). The figure further shows the internal threaded portion 223 arranged to cooperate with a corresponding threaded portion of the wheel spindle axle. A axially inner front face 225 of the hub nut 220, located radially inside the protrusions 224, is arranged to contact the outer end surface 219 on the annular projection 218 of the bearing inner ring 211 (see FIG. 3) as the hub nut 220 is tightened.

The wheel end assembly shown in FIGS. 3 and 5 can be provided with an optional sealing arrangement between the bearing inner ring on the wheel axle spindle. FIG. 5 shows that at least the outer end of the bearing inner ring 211 can be provided with a circumferential groove 230 in its the internal periphery immediately axially inside the rotational lock mechanism comprising the annular projection 218. As indicated in FIG. 3, a sealing element 231 is placed in the circumferential groove 230 to provide a seal between the bearing inner ring 211 and the wheel axle spindle 202.

According to an alternative example, the wheel bearing 210) is a dual roller bearing with a split bearing inner ring as shown in FIG. 2. In this example, an additional circumferential groove can be provided adjacent the axially innermost portion of the second bearing inner ring 213. Such a sealing assembly allows the conventional central seal between the split inner rings 211, 213 to be eliminated The disclosure should not be deemed to be limited to the examples and embodiments described above, but rather a number of further variants and modifications are conceivable within the scope of the following patent claims.

The invention claimed is:

1. A vehicle wheel end assembly comprising:
a wheel hub having a central axis of rotation, which wheel hub is rotatably mounted on a wheel axle spindle by a wheel bearing comprising at least one roller bearing;
wherein the wheel bearing has a bearing inner ring mounted on an external section of the wheel axle spindle and a bearing outer ring mounted in an internal section of the wheel hub;
a threaded hub nut mounted at the end of the wheel axle spindle to fix the bearing inner ring in a predetermined axial position on the wheel axle spindle; and
a rotational lock mechanism arranged to prevent relative rotation between the bearing inner ring and the wheel axle spindle;
wherein the rotational lock mechanism comprises a tangential surface, wherein the tangential surface is a flat surface extending along the axial direction and along a tangential direction with respect to the axis of rotation, wherein the rotational lock mechanism is arranged on an annular projection extending axially out of an outer end surface of the bearing inner ring,
wherein the tangential direction is the chord of a circle segment portion corresponding to an inner circumference of the bearing inner ring, and
wherein the tangential surface is arranged in a plane located at or adjacent an outer radial end surface of the bearing inner ring; and the tangential surface is arranged in contact with a tangential recess in the peripheral surface of the wheel axle spindle to prevent relative rotation.

2. The wheel end assembly of claim 1, wherein the tangential recess in the peripheral surface of the wheel axle spindle is located adjacent to an outer threaded portion for the threaded hub nut on the wheel axle spindle.

3. The wheel end assembly of claim 1, wherein the circle segment portion has a chord length determined by a central angle selected in the interval 5° to 100°.

4. The wheel end assembly of claim 1, wherein the outer periphery of the annular projection has a circumferential recess arranged to cooperate with a resiliently deformable hub nut locking means extending from the threaded hub nut.

5. The wheel end assembly of claim 4, wherein the resiliently deformable hub nut locking means comprises at least one axially extending protrusion, which at least one protrusion is arranged to snap into contact with the circumferential recess.

6. The wheel end assembly of claim 4, wherein the resiliently deformable hub nut locking means comprises an axially extending annular protrusion having multiple radial slots with intermediate protrusions arranged to snap into contact with the circumferential recess.

7. The wheel end assembly of claim 1, wherein at least the outer end of the bearing inner ring comprises a circumferential groove in the internal periphery for a sealing element between the bearing inner ring and the wheel axle spindle.

8. The wheel end assembly of claim 1, wherein the outer end of the bearing inner ring comprises a circumferential groove axially inside the tangential surface of the rotational lock mechanism for a sealing element between the bearing inner ring and the wheel axle spindle.

9. The wheel end assembly of claim 1, wherein the wheel bearing is a dual roller bearing with a split bearing inner ring.

10. A vehicle comprising at least one wheel axle with the wheel end assembly of claim 1.

11. A vehicle wheel end assembly comprising:
- a wheel hub having a central axis of rotation, which wheel hub is rotatably mounted on a wheel axle spindle by a wheel bearing comprising at least one roller bearing;
- wherein the wheel bearing has a bearing inner ring mounted on an external section of the wheel axle spindle and a bearing outer ring mounted in an internal section of the wheel hub;
- a threaded hub nut mounted at the end of the wheel axle spindle to fix the bearing inner ring in a predetermined axial position on the wheel axle spindle; and
- a rotational lock mechanism arranged to prevent relative rotation between the bearing inner ring and the wheel axle spindle;
- wherein the rotational lock mechanism comprises a tangential surface, wherein the tangential surface is a flat surface extending along the axial direction and along a tangential direction with respect to the axis of rotation,
- wherein the tangential direction is the chord of a circle segment portion corresponding to an inner circumference of the bearing inner ring,
- wherein the tangential surface is arranged in a plane located at or adjacent an outer radial end surface of the bearing inner ring; and the tangential surface is arranged in contact with a tangential recess in the peripheral surface of the wheel axle spindle to prevent relative rotation, and
- wherein an outer end of the bearing inner ring comprises a circumferential groove axially inside the tangential surface of the rotational lock mechanism for a sealing element between the bearing inner ring and the wheel axle spindle.

* * * * *